United States Patent [19]
Bowman et al.

[11] 3,750,017
[45] July 31, 1973

[54] ELECTROMAGNETIC FIELD MEASURING DEVICE

[75] Inventors: Ronald R. Bowman; Ezra B. Larsen; Donald R. Belsher, all of Boulder, Colo.

[73] Assignee: The United States of America as represented by the Secretary of the Department of Health, Education, and Welfare, Washington, D.C.

[22] Filed: Sept. 16, 1971

[21] Appl. No.: 181,003

[52] U.S. Cl. .................... 324/72, 324/43, 343/797
[51] Int. Cl. ...................... G01r 31/02, G01r 33/02
[58] Field of Search ................ 324/72, 43; 343/797; 307/311

[56] References Cited
UNITED STATES PATENTS

| | | | |
|---|---|---|---|
| 3,662,260 | 5/1972 | Thomas et al. | 324/72 |
| 3,410,961 | 11/1968 | Slana | 307/311 X |
| 3,628,035 | 12/1971 | Olsson | 307/311 X |
| 2,710,942 | 6/1955 | Emerson | 324/43 R |
| 3,562,755 | 2/1971 | Bonadio | 343/797 X |

OTHER PUBLICATIONS
Elec. Engr. pp. 68–70, April, 1967.

Primary Examiner—Alfred E. Smith
Attorney—Holman & Stern

[57] ABSTRACT

An electromagnetic field measuring device is disclosed having a response which is essentially independent of the physical orientation of the device in the electromagnetic field. Further, the response of the device is essentially independent of the polarization of the field or of the presence of reactive field components or multipath interference. A set of three antennas disposed in a mutually-orthogonal relationship with an essentially common center is provided, the antennas being adapted to be placed in an electromagnetic field to be measured. Sensing means, in the form of diodes for example, are associated with each antenna for deriving a signal therefrom. In the preferred embodiment, such antennas may take the form of dipoles, and diodes are contemplated to be connected between the dipole legs. The derived signals so produced are removed from the antennas in a fashion wherein no substantial perturbation of the field to be measured occurs and without substantially affecting the electrical characteristics of the antenna set. In a preferred embodiment, a high-resistance transmission line is provided. Subsequently, the derived and removed signals are combined and processed so as to generate a measurement reading.

14 Claims, 5 Drawing Figures

PATENTED JUL 31 1973

INVENTORS,
RONALD R. BOWMAN
EZRA B. LARSON
DONALD R. BELSHER

BY Holman & Stern
ATTORNEYS

ELECTROMAGNETIC FIELD MEASURING DEVICE

BACKGROUND OF THE INVENTION

This invention generally relates to electromagnetic field measuring devices and particularly concerns the provision of a portable field instrument utilized to measure complicated electromagnetic fields which may comprise a hazard.

The detection and measurement of hazardous electromagnetic radiation which may pose a biological threat has become increasingly more important in view of the rapid proliferation of electronic appliances such as microwave ovens, and systems such as radio transmitters, airport radars and the like. Such electromagnetic radiation is usually characterised by a relatively complicated electromagnetic field typically having unknown polarization, multipath interference components, and reactive near-field components. Due to the complicated characteristics of the field, accurate measurements of the intensity thereof have proven to be difficult and prior art measurement devices have therefore necessarily been complex and difficult to operate and maintain, particularly by relatively untrained personnel.

A need therefore exists for an electromagnetic field measuring device or instrument which provides a long-sought solution to the problem of easily and accurately quantifying hazardous electromagnetic emanations having complicated field characteristics. It is the primary object of the instant invention to provide such a measuring instrument.

Another, more specific yet equally important objective of the instant invention concerns the provision of an electromagnetic field measuring instrument which serves to accurately measure the strength of hazardous electromagnetic fields, regardless of the physical orientation of the measuring instrument in the electromagnetic field.

A further object of the instant invention concerns the provision of an electromagnetic field measuring device which is portable and which can easily and readily be operated in an accurate manner.

A still further objective of the instant invention contemplates the provision of an electromagnetic field measuring device which includes a probe of such design as to cause minimal scattering of the field, this feature of the instant invention allowing measurement of field strength at a physical location close to the field source without perturbing the impressed (or incident) field itself.

Yet another objective of the instant invention concerns the provision of an electromagnetic field measuring device having a response which is essentially independent of both the local polarization of the field to be measured, and the local configuration of the field.

A still further objective of the instant invention concerns the provision of an electromagnetic field measuring instrument which has a relatively wide dynamic range.

Still further objectives of the instant invention particularly appropriate for use of same as a portable instrument concerns the provision of a field measuring device of the type under consideration which is stable in operation, immune to burnout, rugged, lightweight, physically small, and having a capability of operation by internal, self-contained battery supplies.

SUMMARY OF THE INVENTION

These objectives as well as others which will become apparent as the description proceeds are implemented by the instant inventive electromagnetic field measuring device which comprises, as the sensing probe, a set of three antennas which are disposed in a mutually-orthogonal relationship with one another and having an essentially common center, these antennas being adapted to be placed in an electromagnetic field to be measured. Each of the three antennas are utilized to independently sense three orthogonal components of the unperturbed electromagnetic field to be measured and thus, the instrument responds to an electromagnetic field in a fashion independent of both the local polarization of the field, and the local configuration of the field.

In the preferred inventive embodiment, each of the three antennas so provided are contemplated to comprise dipoles or loop antennas, electric dipole antennas being preferable for measurements of electric fields, while mutually-orthogonal loop antenna constructions have been found to be preferable for sensing the magnetic field portion of the electromagnetic radiation.

The signals developed from the orthogonal antenna set are then sensed or detected through the provision of sensing means associated with each antenna, each sensing means deriving a measurement signal therefrom. The measurement or detected signal is then subsequently led away from the antenna set to a processing station wherein signals are combined or utilized to generate a read out of field strength or field intensity.

Importantly, the method and apparatus by which the antenna signals are acquired, detected, and transmitted from the antenna set to a processing location must be such as to not substantially perturb the field to be measured or substantially affect the essential characteristics of the antennas themselves. To this end, the instant invention contemplates, in one embodiment, the provision of a detector means such as diodes disposed at the essentially common center of the antenna set and, in the event that dipole antennas are utilized, between the gap provided by each dipole leg. In this fashion, the signal developed across each diode has a direct current component related to the magnitude of the field received by each individual antenna. This direct current signal is contemplated to be led away from the antenna set through the provision of a high-resistance transmission line coupled to each diode.

In this respect, it should be understood that conventional wires having relatively low resistance cannot be utilized as the transmission line means of the instant invention since such conventional wires will substantially perturb the electric field to be measured and will substantially change the essential electrical characteristics of the antenna set. This retransmission or signal extraction problem only arises with the utilization of three mutually orthogonal antennas such as is contemplated by the instant invention since with field sensors employing only two orthogonal antennas, it is easy to derive signals from such sensors by utilizing conventional low-resistance wires placed along the third orthogonal axis. It should be noted, however, that high-resistance wires suitable for use with the instant measuring device can be made from low resistivity materials such as aluminum or gold. For instance, narrow strips of deposited thin films of aluminum or gold can be made to have high-resistance per unit length.

The signals, once extracted, are preferably combined in a non-linear summing amplifier having characteristics so as to yield a combined signal proportional to the sum of the squares of the orthogonal components of the electric (or magnetic) field along the axes of the three corresponding orthogonal antennas. Then it is easy to further process the combined signal to provide a display of either the electric (or magnetic) volumetric energy density, or the Hermitian magnitude of the electric (or magnetic) field, or the square of the Hermitian magnitude of the electric (or magnetic) field, all of these quantities being meaningful and useful measures of the strength or intensity of the field. Further, if the field of interest locally is essentially a single propagating plane-wave field, then the combined signal can be used to display the power density of the field.

Throughout the instant specification, the term "antenna" should be understood to mean either an electric dipole antenna, a loop antenna (sometimes called a magnetic dipole antenna), or any other antenna having the following important and necessary characteristics:

1. a response that is essentially determined by only one directional component of the impressed electric (or magnetic) field;
2. capable of being oriented into an orthogonal array with two other like antennas such that all three antennas have an essentially common center; and
3. when assembled into an orthogonal array as just described, the response of the antenna to the impressed field must be essentially independent of the presence of the other two antennas.

BRIEF DESCRIPTION OF THE DRAWINGS

The invention itself will be better understood and further advantages thereof will become apparent from the following detailed description of preferred inventive embodiments, such description making reference to the appended sheets of drawings wherein.

DETAILED DESCRIPTION OF A PREFERRED INVENTIVE EMBODIMENT

Figure 1:
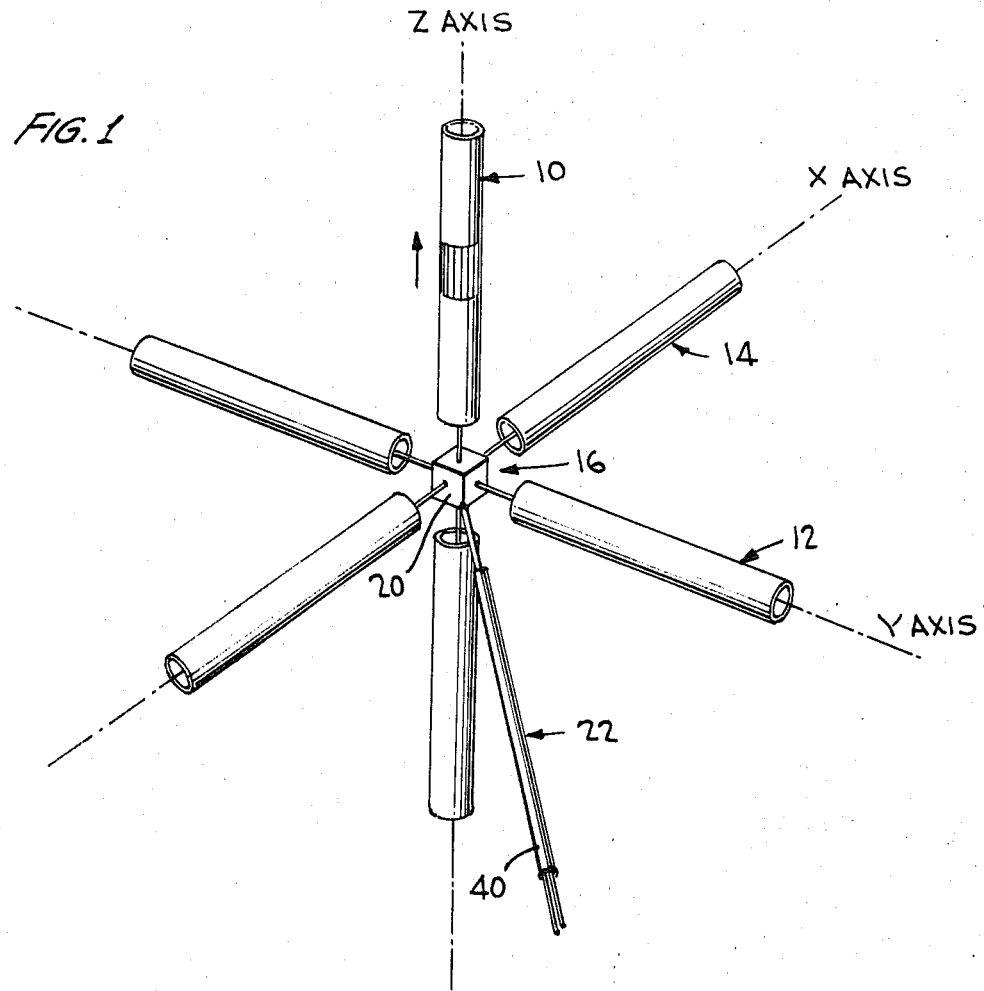
FIG. 1 is a perspective illustration of the sensing probe of the instant measuring device, such sensing probe comprising a set of three antennas disposed in a mutually-orthogonal relationship to one another having an essentially common center at which the signals are extracted.

Referring now to the drawings and particularly to FIG. 1 thereof, the overall construction of the sensing probe of the instant invention is depicted and, in accordance with the novel principles exporessed herein, such field sensors preferably take the form of a set of three mutually-orthogonal antennas such as but not limited to dipoles 10, 12, and 14, these antennas being disposed with an essentially common center designated by reference numeral 16. In the preferred construction, each of the dipole antennas 10, 12 and 14 are of electrically small dimension and of substantially equal lengths. With such an arranement, each dipole antenna of the antenna set responds to the impressed electromagnetic field in a fashion which is independent of the other two dipoles, as is shown hereinbelow.

The net voltage induced across the center gap between the two legs of each dipole 10, 12, and 14, will be the phasor sum of the voltage induced by the impressed electromagnetic field plus the voltages induced by the net currents which will flow on the other two dipoles of the set.

In this respect, consider any element of current 18, however produced, on a leg of one of the dipoles, such as antenna 10. Because of the symmetry of the other two dipoles 12 and 14 with respect to this arbitrary current element, the current element induces a symmetric potential distribution on these dipoles. Therefore, any distribution of current on one of the dipoles cannot induce an unbalanced potential across the center gaps of the other two dipoles. The net induced voltages across the dipoles are then those which would be induced by the impressed field on each dipole if placed singly, and with the same orientation, in the field. It should be appreciated that even if the dipoles perturb the impressed field, they will still measure this perturbed field without any mutual interaction between the dipoles. (However, the perturbation of the field will be different for all three dipoles than for one dipole alone.) It further should be noted that if equal impedances are placed symmetrically between the legs of each dipole 10, 12, and 14, the dipoles will still act independently. Additionally, the dipoles need not necessarily be electrically short as the only necessary requirements are that the dipoles be thin so that the induced currents flow only along the dipoles' lengths.

Assume, now, that the dipoles 10, 12, and 14 of the sensor are short enough that the curvature of the electric component of any field of interest will be small with respect to the length of the dipoles. Then the induced voltage amplitudes developed across the center gaps of the dipoles are given by $$V_X = LE_X, \quad V_Y = LE_Y, \quad V_Z = LE_Z \tag{1}$$

where $L$ is the effective length of the dipoles; and $E_X$, $E_Y$, $E_Z$ are the amplitudes of the electric field component vectors along the lengths of the respective dipoles 14, 12, and 10. Using root-mean-square values, the electric energy density $U_E$ is given by $$U_E = \tfrac{1}{2} \epsilon_o (E_X^2 + E_Y^2 + E_Z^2) = \epsilon_o/2L^2 (V_X^2 + V_Y^2 + V_Z^2) \tag{2}$$

for any field in space. If the field is locally plane-wave, the power density S is given by $$S = (E_x^2 + E_y^2 + E_z^2)/Z_0 = (V_x^2 + V_y^2 + V_z^2)/L^2 Z_0 \quad (3)$$

for arbitrarily polarized plane waves. One can define an effective field strength, or Hermitian magnitude $E_e = (E_x^2 + E_y^2 + E_z^2)^{1/2}$. Then relation (2) can be rewritten as $$U_E = (\tfrac{1}{2}) \epsilon_0 E_e^2 = \epsilon_0/2L^2 \, (V_x^2 + V_y^2 + V_z^2) \quad (4)$$

and relation (3) can be rewritten as $$S = E_e^2/Z_0 = (V_x^2 + V_y^2 + V_z^2)/L^2 Z_0 \quad (5)$$

At microwave frequencies, for example, it is difficult to accurately determine the induced voltages of a dipole. However, it is not necessary to know the induced voltages since the probe can be calibrated. It is only necessary to acquire signals or combined signals from the dipoles that can be processed to yield a signal proportional to $(V_x^2 + V_y^2 + V_z^2)^{1/2}$, or a signal proportional to $(V_x^2 + V_y^2 + V_z^2)$ depending on the desired units of the ultimate readout.

The induced voltages on each dipole 10, 12, and 14 are then sensed or detected by sensing means generally designated by reference numeral 20 and preferably disposed at the essentially common center 16 of the antenna set, this detected signal then being led away from the antenna set to a remote signal processing location, for example, via high-resistance transmission line means generally designated by reference numeral 22, as will be discussed in more detail hereinbelow.

Figure 2:
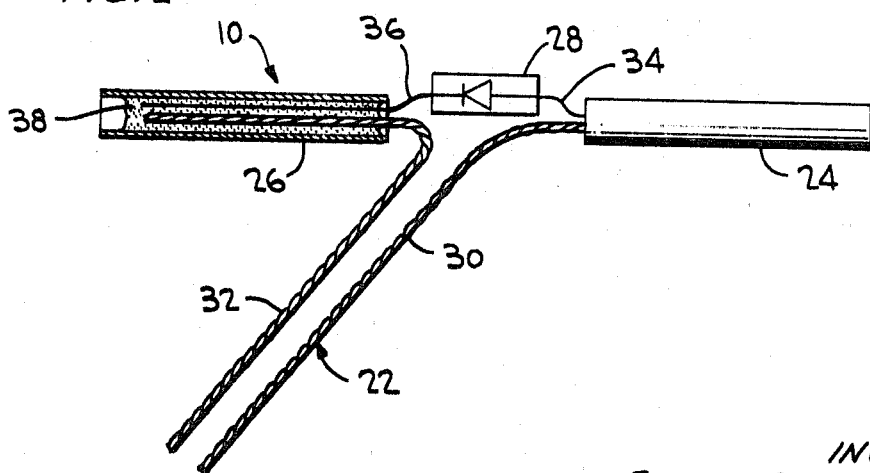
FIG. 2 is a diagrammatic illustration, partially broken away for illustrative clarity, depicting the preferred construction of each dipole antenna, for example, utilized in the mutually-orthogonal antenna set, this Figure further showing the utilization and placement of the sensing means, and of the transmission line from the antenna to a processing location.

Referring now to FIG. 2 of the appended drawings, a detailed construction of an exemplary dipole antenna utilized in the antenna set of FIG. 1 is depicted. For purposes of explanation, let it be assumed that the illustrated dipole is antenna 10 of the set of FIG. 1. The dipole is seen to preferably comprise two legs 24 and 26 of hollow metallic construction. The sensing means provided is contemplated to preferably comprise a diode 28 disposed between each of the two legs 24 and 26 of the dipole 10, similar diodes 28 being contemplated to be disposed between each of the legs of the other antennas of the set. The detected voltages referred to hereinabove are acquired by means of such diodes 28, diode 28 essentially rectifying the radio frequency signal generated by dipole antenna 10 and providing a direct current component related to the field intensity magnitude of the field component of the incident wave that is parallel to antenna 10. This derived direct current signal is coupled to a remote signal processing location, in the preferred inventive embodiment, via a high-resistance transmission line 22 which, in the preferred inventive embodient, comprises two parallel-wire conductors 30 and 32 respectively connected to leads 34 and 36 of the diode sensing means 28.

From a structural point of view, the instant invention contemplates the utilization of each leg 24 and 26 of the dipole antenna 10 to securely hold the leads 34 and 36 of diode 28 and the individual conductors 30 and 32 of the transmission line 22 physically, and electrically coupled. Thus, the ends of each of the transmission line conductors 30 and 32 and the leads 34 and 36 of diode 28 are disposed inside the respective hollow legs of the dipole 10 and the center of each leg is contemplated to be filled with an electrically conductive glue such as is depicted by reference numeral 38.

As mentioned at the outset, the manner in which the signals developed by the sensing means or diodes 28 are removed from the antenna set comprises an important feature of the instant invention. In this respect, it is not possible to utilize conventional wires as the conductors 30 and 32 of the transmission line means 22 since, if this were done, the wires may well serve to substantially perturb the electric field to be measured or substantially affect the essential characteristics of the antenna set itself. It is for this reason that the invention contemplates the utilization of high-resistance conductors 30 and 32 for utilization in the transmission line means 22 and, in the preferred construction, each of the conductors are contemplated to comprise carbon conductors or, more specifically, a mixture of carbon and Teflon (poly(tetrafluoroethylene)). The individual conductors 30 and 32 are further contemplated to be wrapped or covered with a film of non-conductor generally designated by reference numeral 40 in FIG. 1.

Each of the conductors 30 and 32 of the transmission line means 22 coupled to each antenna of the set are further contemplated to be bundled together and extracted in a particular manner. Specifically, the three transmission line means utilized in association with the three antennas of the set are formed into a bundle and then withdrawn from the set of dipoles at equal angles from each dipole so as to minimize and balance any interaction between the transmission lines and the dipole antennas. Explained in other words, if a cube is conceptually imagined having its center at the center of the set of dipoles as depicted in FIG. 1 and with each dipole leg projecting perpendicularly through a face of the cube, then the bundle of transmission lines is contemplated to project through a corner of the cube.

Figure 5:
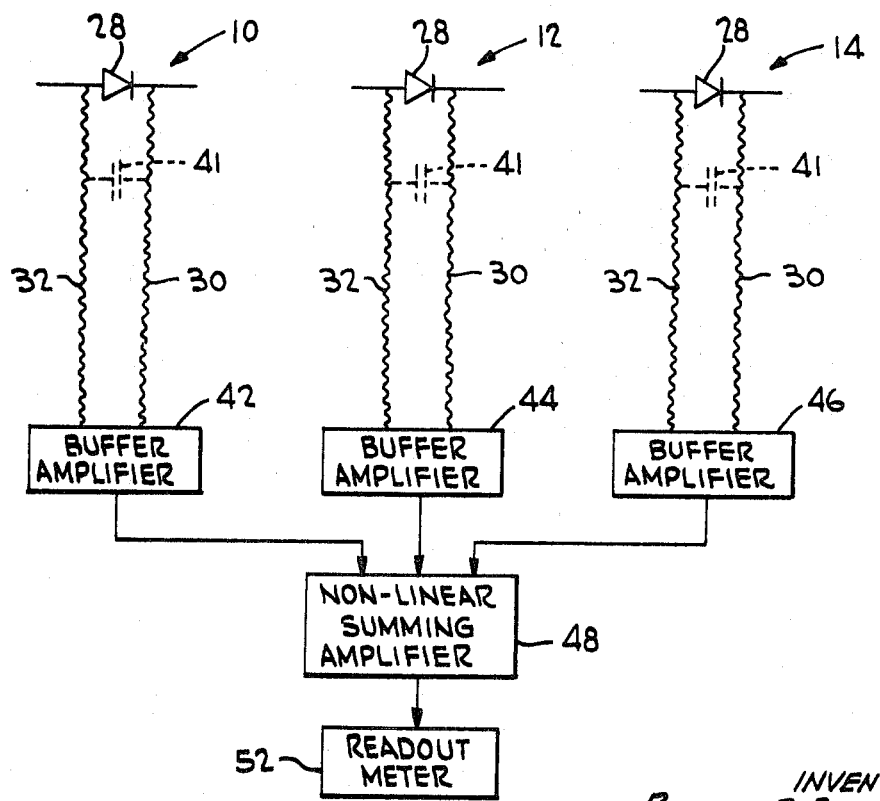
FIG. 5 is an electrical schematic diagram of the overall system of the instant invention particularly depicting the signal processing means contemplated for utilization therewith.

Referring now to FIG. 5 of the appended drawings, the signal processing means of the instant invention is illustrated and it should be noted that the signals developed by each of the three dipoles 10, 12, and 14 and sensed by the diode detectors 28, are extracted, in the manner described above, through the high-resistance transmission line means 22 provided for each antenna. It further should be noted that the high-resistance and the distributed capacitance 41 of the transmission lines 22 further form appropriate filters for the rectified radio frequency signals extracted from the antennas.

The rectified and filtered signals from antennas 10, 12, and 14 are contemplated to be fed into buffer amplifiers 42, 44, and 46, respectively, the outputs from each buffer amplifier then being fed into a non-linear summing amplifier means 48. The various signals are shaped and summed in amplifier means 48 to provide a combined output signal on line 50 that has an amplitude proportional to the sum of the squares of the amplitudes of the electric field components parallel to dipole antennas 10, 12, and 14. The output from amplifier means 48 on line 50 is then applied to a read-out meter means 52 which responds to the amplitude of the combined signal so as to provide an indication of the electric field energy density, for example.

It should be noted, however, that for electric fields of certain strengths, the functional relationship between the radio frequency signal amplitudes produced by the antennas, and the detected signals sensed by the diodes will essentially conform to a "square-law" relationship wherein the direct current component of the rectified radio frequency signal will be proportional to the square of the amplitude of the radio frequency signal induced on each antenna. In this situation, the direct current signals from the three diodes respectively utilized with the antennas 10, 12, and 14 of the antenna set can be directly summed at or near the center 16 of the antennas. Yet, it still may be useful or desirable to transmit these three signals separately away from the antenna set before combining the signals, even when the signals can easily be combined at or near the center of the antenna set as explained.

Figure 3:
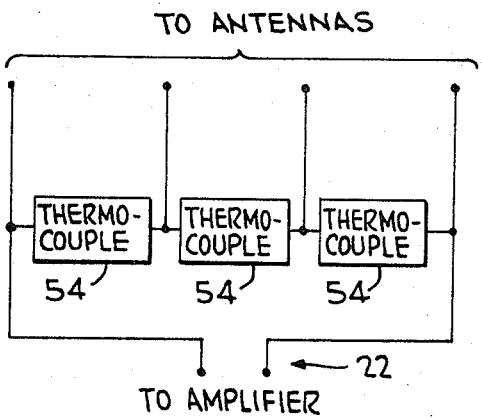
FIG. 3 is a schematic diagram of an alternative embodiment of the sensing means of the instant invention utilizing thermocouples to produce a combined signal from each of the three mutually-orthogonal antennas of the probe.

It should further be appreciated by those skilled in the art that other structural arrangements could be utilized to provide a combined signal for measurement purposes having the characteristics discussed above. For example, and referring specifically to FIG. 3 of the appended drawings, three square-law thermocouples 54 could be connected in series circuit together and individually across each of the antennas of the antenna set and disposed at the essential center 16 of the antennas. Each signal developed by dipole antennas 10, 12, and 14 would be applied to a respective one of the thermocouples 54 as shown, and the output of the series connection of the thermocouples would comprise the combined measurement signal having the desired characteristics. This output would then be led away to a metering device or amplifier via a transmission line 22 of construction similar to that discussed above.

Figure 4:
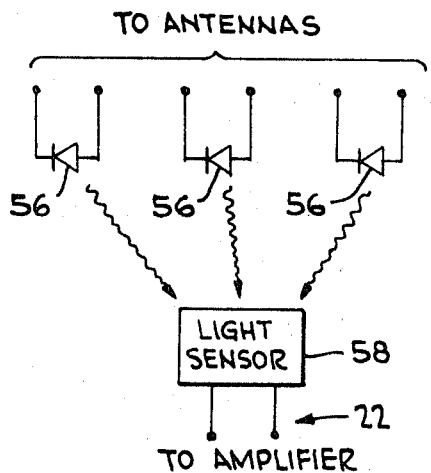
FIG. 4 is a schematic diagram of yet another embodiment of the sensing means of the instant invention utilizing light producing diodes across each of the antennas in conjunction with a light responsive voltage generator to produce the antenna signals.

As a still further alternative, attention is directed to FIG. 4 of the appended drawings wherein three light emitting diodes 56 are contemplated to be positioned at the common center 16 of the antenna set and take the place of rectifying diodes 28. Each signal generated by the antennas 10, 12, and 14 would be developed across a respective one of the diodes 56 and the light produced by each diode would be directed on a light detector or detectors 58, the output of the light detector 58 providing the combined measurement signal and being led away to an amplifier or meter via transmission line 22. Also, the light produced by each diode could be directed on a remote light detector or detectors 58 by coupling the produced light through light-transparent fibers, or a single fiber, that would essentially not perturb the field to be measured, the fiber or fibers then forming the transmission line.

Many other arrangements for the sensing means and the transmission means of the instant invention will occur to those of ordinary skill in the art. For example, thermistors, barretters, ion tubes, Golay cells and the like of suitable construction may function as a sensing means, while tubing to transmit gas pressure generated by a Golay cell, electromagnetic transmission at an appropriate frequency, ifra-red radiation and the like could function as the transmission means. It is emphasized, however, that the preferred embodiment of the instant field measuring device, the other alternative arrangements described above, and also any further arrangements that will be obvious to those skilled in the art but which are not described herein, all have or must have certain important and necessary features within the broad scope of the instant invention. These important and necessary features are: (1) a set of three mutually orthogonal antennas that will each independently respond to a single corresponding orthogonal component of an electric (or magnetic) field; (2) a sensing means for acquiring signals from the set of antennas without essentially perturbing either the impressed field or the electrical characteristics of the antenna set; and (3) a means of processing the signals, either at or near the set of antennas or at remote locations, to form a composite signal proportional to the sum of the squares of the three orthogonal electric (or magnetic) field components, the processing means being required to essentially not perturb either the impressed field or the electrical characteristics of the antenna set.

As should now be apparent, the objects initially set forth at the outset of this specification have been successfully achieved.

What is claimed is:

1. An electromagnetic field measuring device comprising:
   a set of three receiving antennas disposed in a mutually-orthogonal relationship with an essentially common center, said antennas being adapted to be placed in a field to be measured with each antenna responding independently to a single corresponding orthogonal component of the field;
   sensing means including a transmission means associated with each antenna for acquiring a signal therefrom without essentially perturbing the impressed field or the electrical characteristics of the antenna set; and
   processing means for forming a composite signal proportional to the sum of the squares of the induced antenna voltages without essentially perturbing the impressed field or the electrical characteristics of the antenna set, said processing means generating a measurement read-out indicative of field characteristics.

2. A measuring device as defined in claim 1, wherein said transmission means comprise high-resistance wires.

3. A measuring device as defined in claim 1, wherein said sensing means are disposed at said essentially common center of said antenna set.

4. A measuring device as defined in claim 3, wherein said sensing means comprise diodes.

5. A measuring device as defined in claim 2, wherein each said high-resistance transmission line is bundled together and withdrawn from said antenna set at equal angles to each antenna, and wherein said sensing means are disposed at said essentially common center of said antenna set.

6. A measuring device as defined in claim 2, wherein each said high-resistance transmission line comprises carbon conductors.

7. A measuring device as defined in claim 5, wherein each antenna comprises a dipole antenna.

8. A measuring device as defined in claim 2, wherein each antenna comprises a loop antenna.

9. A measuring device as defined in claim 7, wherein each dipole antenna has two legs of hollow tubular metallic construction, each sensing means comprising a diode coupled between the two legs of each dipole, and wherein each said high- resistance transmission line means comprises a carbon conductor pair coupled across each respective diode, the ends of each said carbon conductor pair and lead wires for each said diode being disposed inside respective hollow legs of said dipole and being physically and electrically connected together by means of electrically conductive glue disposed inside said hollow dipole legs.

10. A measuring device as defined in claim 1, wherein each sensing means comprises a light-emitting diode for generating light impulses in accordance with the signal received by each antenna, and a transducer associated with said light-emitting diode for converting said light impulses into an electrical signal.

11. A measuring device as defined in claim 10, wherein said transmission means comprise light-transmissive fibers.

12. A measuring device as defined in claim 10, wherein said transmission means comprise a high-resistance transmission line.

13. A measuring device as defined in claim 2, wherein each sensing means comprises a thermocouple, each thermocouple being connected in series circuit, and wherein said transmission means is connected across said series connection of thermocouples.

14. A measuring device as defined in claim 1, wherein each acquired signal is amplified and summed in a non-linear amplifier means, the output of which defines a combined signal having an amplitude proportional to the sums of the squares of the amplitude of each induced antenna voltage, said output being applied to a read-out means, said amplifier means and said read-out means defining said processing means.

* * * * *